United States Patent
Hennelly

(10) Patent No.: US 9,383,816 B2
(45) Date of Patent: Jul. 5, 2016

(54) TEXT SELECTION USING HMD HEAD-TRACKER AND VOICE-COMMAND

(71) Applicant: Kopin Corporation, Westborough, MA (US)

(72) Inventor: Sean Hennelly, West Bridgford (GB)

(73) Assignee: Kopin Corporation, Westborough, MA (US)

( * ) Notice: Subject to any disclaimer, the term of this patent is extended or adjusted under 35 U.S.C. 154(b) by 0 days.

(21) Appl. No.: 14/540,905

(22) Filed: Nov. 13, 2014

(65) Prior Publication Data

US 2015/0138073 A1    May 21, 2015

Related U.S. Application Data

(60) Provisional application No. 61/905,131, filed on Nov. 15, 2013.

(51) Int. Cl.
*G09G 5/00* (2006.01)
*G06F 3/01* (2006.01)
(Continued)

(52) U.S. Cl.
CPC ............ *G06F 3/012* (2013.01); *G02B 27/0101* (2013.01); *G02B 27/017* (2013.01);
(Continued)

(58) Field of Classification Search
CPC ......... G06F 3/011; G06F 3/012; G06F 3/017; G06F 3/0236; G06F 3/04812; G06F 3/0482; G06F 3/0484; G06F 3/167; G02B 27/017; G02B 2027/014; G10L 15/26; H04N 13/044
See application file for complete search history.

(56) References Cited

U.S. PATENT DOCUMENTS

| | | | |
|---|---|---|---|
| 4,836,670 A | 6/1989 | Hutchinson | |
| 5,633,993 A | 5/1997 | Redmann | |

(Continued)

FOREIGN PATENT DOCUMENTS

| | | |
|---|---|---|
| EP | 2 098 947 | 9/2009 |
| WO | WO 2015/073869 | 5/2015 |

(Continued)

OTHER PUBLICATIONS

International Search Report and Written Opinion of PCT/US2014/065771 entitled "Automatic Speech Recognition (ASR) Feedback for Head Mounted Displays (HMD)" dated Feb. 5, 2015.

(Continued)

*Primary Examiner* — Joe H Cheng
(74) *Attorney, Agent, or Firm* — Hamilton, Brook, Smith & Reynolds, P.C.

(57) ABSTRACT

A joint head tracker and voice command in a headset computer enables hands-free user text selection. The method and system enables an end-user to select sections of text without requiring use of a mouse cursor control input device. Embodiments include a headset computer, including a processor, configured to display text in a screen view. The computer further configured to place a first point within the displayed text according to one or more of first head tracking information, first voice commands and first gestures, and place a second point within the displayed text according to second head tracking information, second voice commands and second gestures. The computer further configured to select a text section between the first point and the second point in response to one or more of third head tracking information, third voice commands and third gestures, and display the selected text section as a highlighted text section.

16 Claims, 9 Drawing Sheets

(51) Int. Cl.
  *G06F 3/16* (2006.01)
  *G02B 27/01* (2006.01)
  *G06T 11/60* (2006.01)
  *G09G 5/10* (2006.01)
  *G06F 17/24* (2006.01)

(52) U.S. Cl.
  CPC ............ *G02B27/0176* (2013.01); *G06F 3/017* (2013.01); *G06F 3/167* (2013.01); *G06T 11/60* (2013.01); *G09G 5/10* (2013.01); *G02B 2027/014* (2013.01); *G06F 17/24* (2013.01)

(56) References Cited

U.S. PATENT DOCUMENTS

| | | | |
|---|---|---|---|
| 5,999,895 A | 12/1999 | Forest | |
| 6,084,556 A | 7/2000 | Zwern | |
| 6,100,871 A | 8/2000 | Min | |
| 6,124,843 A | 9/2000 | Kodama | |
| 6,278,975 B1 | 8/2001 | Brant et al. | |
| 6,313,864 B1* | 11/2001 | Tabata | G09G 5/00 345/8 |
| 7,403,898 B2 | 7/2008 | Slemmer | |
| 7,489,297 B2 | 2/2009 | Hohmann | |
| 8,643,951 B1 | 2/2014 | Wheeler | |
| 8,745,058 B1 | 6/2014 | Garcia-Barrio | |
| 8,830,165 B1 | 9/2014 | Heath | |
| 8,929,954 B2 | 1/2015 | Jacobsen | |
| 9,122,307 B2 | 9/2015 | Jacobsen | |
| 9,141,197 B2 | 9/2015 | MacDougall | |
| 9,235,272 B1 | 1/2016 | Brooks-Heath | |
| 9,311,718 B2 | 4/2016 | Scavezze | |
| 2006/0041433 A1 | 2/2006 | Slemmer et al. | |
| 2008/0114603 A1 | 5/2008 | Desrochers | |
| 2008/0316212 A1* | 12/2008 | Kushler | G06F 3/0482 345/467 |
| 2009/0228842 A1* | 9/2009 | Westerman | G06F 3/04883 715/863 |
| 2009/0243967 A1* | 10/2009 | Kato | G02B 27/017 345/8 |
| 2010/0235726 A1* | 9/2010 | Ording | G06F 1/1626 715/234 |
| 2012/0035934 A1 | 2/2012 | Cunningham | |
| 2012/0127082 A1* | 5/2012 | Kushler | G06F 3/04886 345/169 |
| 2012/0236025 A1 | 9/2012 | Jacobsen et al. | |
| 2013/0006957 A1 | 1/2013 | Huang | |
| 2013/0141360 A1 | 6/2013 | Compton et al. | |
| 2013/0147836 A1* | 6/2013 | Small | G06F 3/011 345/633 |
| 2013/0169532 A1 | 7/2013 | Zahnke | |
| 2013/0271360 A1 | 10/2013 | MacDougall et al. | |
| 2013/0288753 A1 | 10/2013 | Jacobsen et al. | |
| 2013/0300661 A1* | 11/2013 | Ezra | G06F 1/1643 345/158 |
| 2014/0358536 A1* | 12/2014 | Choi | G10L 15/26 704/235 |
| 2015/0138074 A1 | 5/2015 | Hennelly et al. | |
| 2015/0138084 A1 | 5/2015 | Hennelly et al. | |
| 2015/0142440 A1 | 5/2015 | Parkinson et al. | |
| 2015/0227209 A1 | 8/2015 | Nicholson | |
| 2015/0331492 A1 | 11/2015 | Woo | |

FOREIGN PATENT DOCUMENTS

| | | |
|---|---|---|
| WO | WO 2015/073874 | 5/2015 |
| WO | WO 2015/073879 | 5/2015 |
| WO | WO 2015/073880 | 5/2015 |

OTHER PUBLICATIONS

International Search Report and Written Opinion of PCT/US2014/065787 entitled "Head Tracking Based Gesture Control Techniques for Head Mounted Displays" dated Feb. 9, 2015.

International Search Report and Written Opinion for PCT/US2014/065788 dated Feb. 26, 2015 entitled "Head-Tracking Based Selection Technique for Head Mounted Displays (HMD)".

International Search Report and Written Opinion of PCT/US2014/065778, titled "Text Selection Using HMD Head-Tracker and Voice-Command," Dated: Mar. 4, 2015.

* cited by examiner

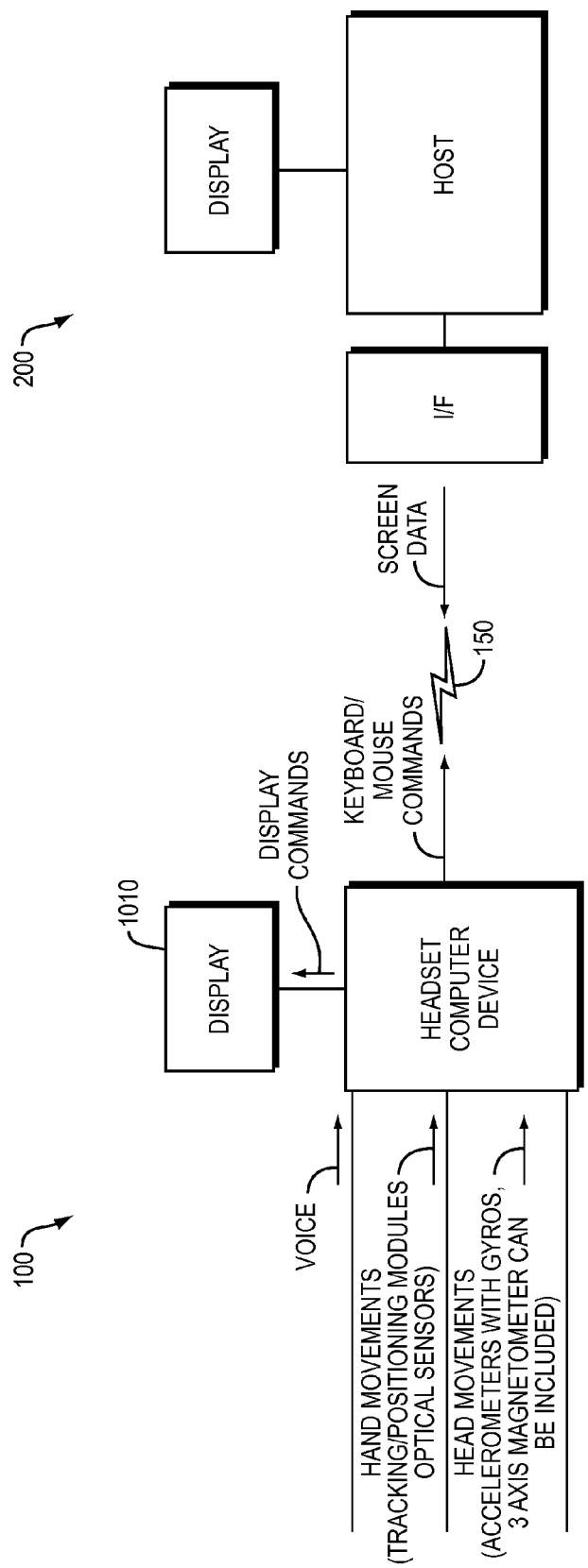

TEXT SELECTION USING HMD HEAD-TRACKER AND VOICE-COMMAND

RELATED APPLICATIONS

This application claims the benefit of U.S. Provisional Application No. 61/905,131, filed on Nov. 15, 2013.

This application is related to the following U.S. patent applications:

U.S. patent application Ser. No. 14/540,939, filed Nov. 13, 2014, entitled "Head-Tracking Based Selection Technique For Head Mounted Displays (HMD)."

U.S. patent application Ser. No. 14/540,943, filed Nov. 13, 2014, entitled "Automatic Speech Recognition (ASR) Feedback For Head Mounted Displays (HMD)."

U.S. patent application Ser. No. 14/540,974, filed Nov. 13, 2014, entitled "Head Tracking Based Gesture Control Techniques For Head Mounted Displays."

The entire teachings of the above applications are incorporated herein by reference.

FIELD OF THE INVENTION

This invention relates to the use of a head-mounted display device (HMD)/Head Set Computer (HSC), and the selection of blocks of text using the head-tracker and voice-command control, where no mouse or similar cursor control input device is available or where it is inconvenient or undesirable to use such a device.

BACKGROUND OF THE INVENTION

Mobile computing devices, such as a laptop or notebook PC, a smart phone, and tablet computing device, are now common tools used for producing, analyzing, communicating, and consuming data in both business and personal life. Consumers continue to embrace a mobile digital lifestyle as the ease of access to digital information increases with high speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free, high quality, portable, color display solution to augment or replace their hands-dependent mobile devices.

SUMMARY OF THE INVENTION

Recently developed micro-displays can provide large-format, high-resolution color pictures and streaming video in a very small form factor. One application for such displays can be integrated into a wireless headset computer worn on the head of the user with a display within the field of view of the user, similar in format to eyeglasses, audio headset or video eyewear.

A "wireless computing headset" device, also referred to herein as a headset computer (HSC) or head mounted display (HMD), includes one or more small, high resolution micro-displays and associated optics to magnify the image. The high resolution micro-displays can provide super video graphics array (SVGA) (800×600) resolution or extended graphic arrays (XGA) (1024×768) resolution, or higher resolutions known in the art.

A wireless computing headset contains one or more wireless computing and communication interfaces, enabling data and streaming video capability, and provides greater convenience and mobility through hands dependent devices.

For more information concerning such devices, see co-pending patent applications entitled "Mobile Wireless Display Software Platform for Controlling Other Systems and Devices," U.S. application Ser. No. 12/348, 648 filed Jan. 5, 2009, "Handheld Wireless Display Devices Having High Resolution Display Suitable For Use as a Mobile Internet Device," PCT International Application No. PCT/US09/38601 filed Mar. 27, 2009, and "Improved Headset Computer," U.S. Application No. 61/638,419 filed Apr. 25, 2012, each of which are incorporated herein by reference in their entirety.

Within a text-rich environment, such as a word processing editor, a webpage, or a document with text, the user may want to highlight a selection of text in order to carry out a function on that selection, such as copying or deleting. Performing such functions is challenging on a voice-controlled HMD.

To solve this problem, the present invention utilizes jointly the head-tracker and voice-control functionality. The user may invoke the select text function using a voice command. Doing so freezes or makes stationary the panning of the relevant screen, and then brings up a head-tracker cursor on the screen view or display. When the user moves his head around, the cursor moves responsively in the same direction In one embodiment, the relationship between had movement and cursor movement may be one-to-one, although other relationship ratios may also be used.

The user may move the head tracker cursor to the first point (Point 1), at the beginning or at the end of the section of text desired to be selected. The user then issues a voice command to pinpoint the Point 1 location, and frees the head-tracker cursor to move around the screen again. The user can then move the cursor to a second point, the point being after/before the section of text desired to be selected (Point 2), in correspondence to Point 1. Much like with mouse selection of text, the text between the two Points (Points 1 and 2) is displayed highlighted or is otherwise represented as being 'selected text' (i.e., a text selection as a working unit/item). The user is then presented with options to carry out functions on this text selection, such as copy and delete. Thus embodiments of the present invention enable a user to select sections of text (in order to carry out other functions) without having to use a mouse-type input device. This results in hands-free text selection, and more aptly joint head-tracking and voice command text selection.

In one aspect, the invention is a computer-based method of selecting text. With a headset computer, including a processor, the headset computer displays text in a screen view. The method includes placing a first point within the displayed text according to one or more of first head tracking information, first voice commands and first gestures. The method further includes placing a second point within the displayed text according to second head tracking information, second voice commands and second gestures. The method also includes selecting a text section between the first point and the second point in response to one or more of third head tracking information, third voice commands and third gestures, and displaying the selected text section as a highlighted text section.

One embodiment further includes making the highlighted text section available for a common operation. In another embodiment, the common operation includes one or more of copy, paste, cut, move, email and forward. The common operation may be selectable by one or more of (i) a pop-up option window, (ii) a drop down menu, or other such techniques for presenting one or more selectable options.

In one embodiment, placing the first point or placing the second point further includes manipulating a pointer within the screen view until the pointer reaches a desired location, and using one or more of a particular voice command or a particular gesture to instantiate the first point or second point. In another embodiment, the pointer includes an associated symbol that provides one or more of (i) a text magnifier and (ii) a text delineator.

In one embodiment, the first point and the second point are each characterized by a symbol. The symbol may be a bracket, or other such symbol for encompassing or otherwise delineating information. The symbol may periodically appear and disappear for a predetermined duration after being placed, to call attention to its instantiation.

In one embodiment, the highlighted text section may be characterized by a colored background, although in some embodiments the highlighted text may be characterized by other alternative enhancements, such as shaded background, underlining, italicizing, colored text, or other such techniques know for calling attention to information.

In another aspect, the invention is a system for facilitating hands-free text selection. The system includes a headset computer, including a processor, configured to display text in a screen view, to place a first point within the displayed text according to one or more of first head tracking information, first voice commands and first gestures, and to place a second point within the displayed text according to second head tracking information, second voice commands and second gestures. The system further selects a text section between the first point and the second point in response to one or more of head tracking information, voice commands and gestures, and displays the selected text section as a highlighted text section.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2 is a block diagram of flow of data and control in the embodiment of FIGS. 1A-1B.

DETAILED DESCRIPTION OF THE INVENTION

A description of example embodiments of the invention follows.

Figure 1A:
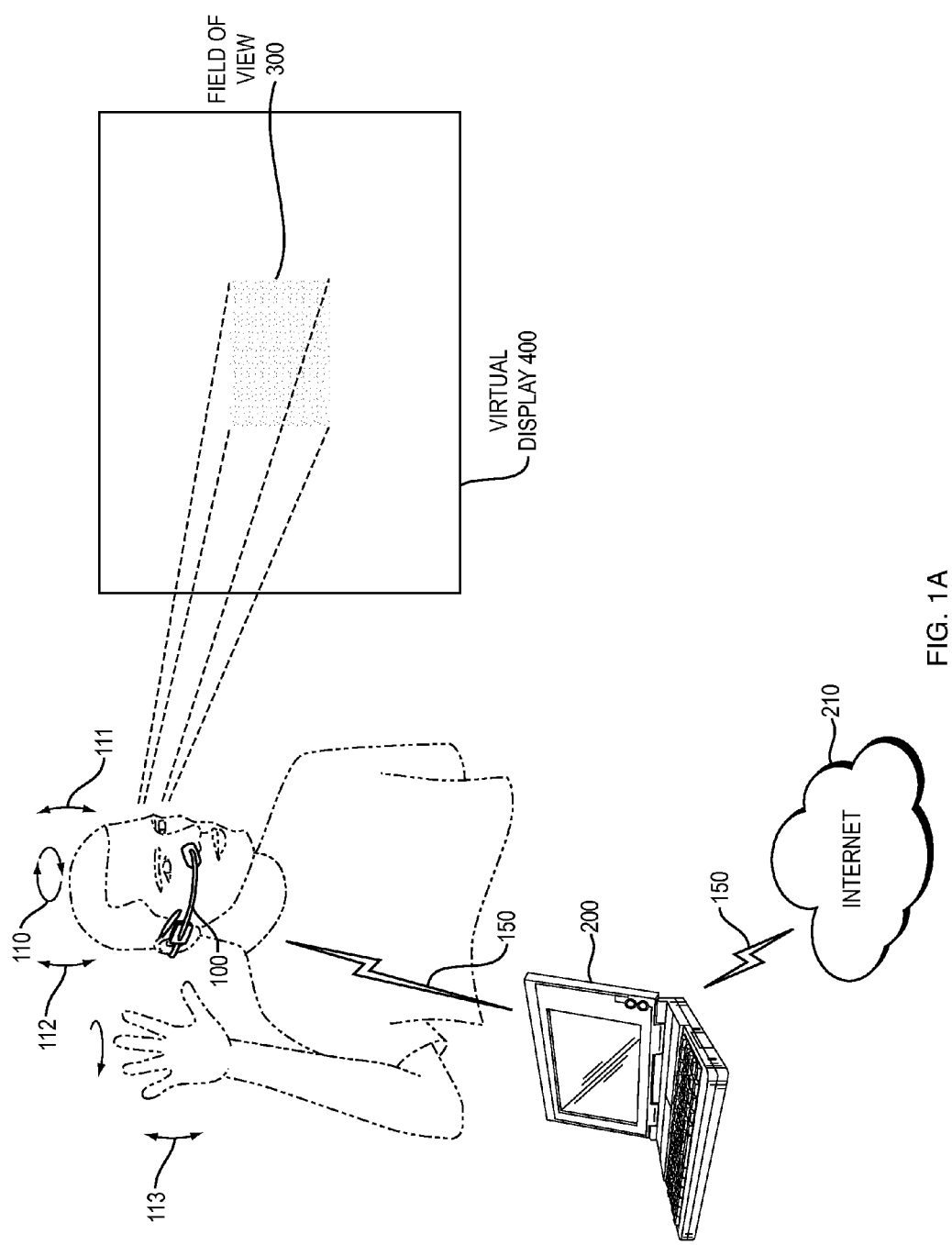
FIGS. 1A-1B are schematic illustrations of a headset computer cooperating with a host computer (e.g., Smart Phone, laptop, etc.) according to principles of the present invention.
Figure 1B:
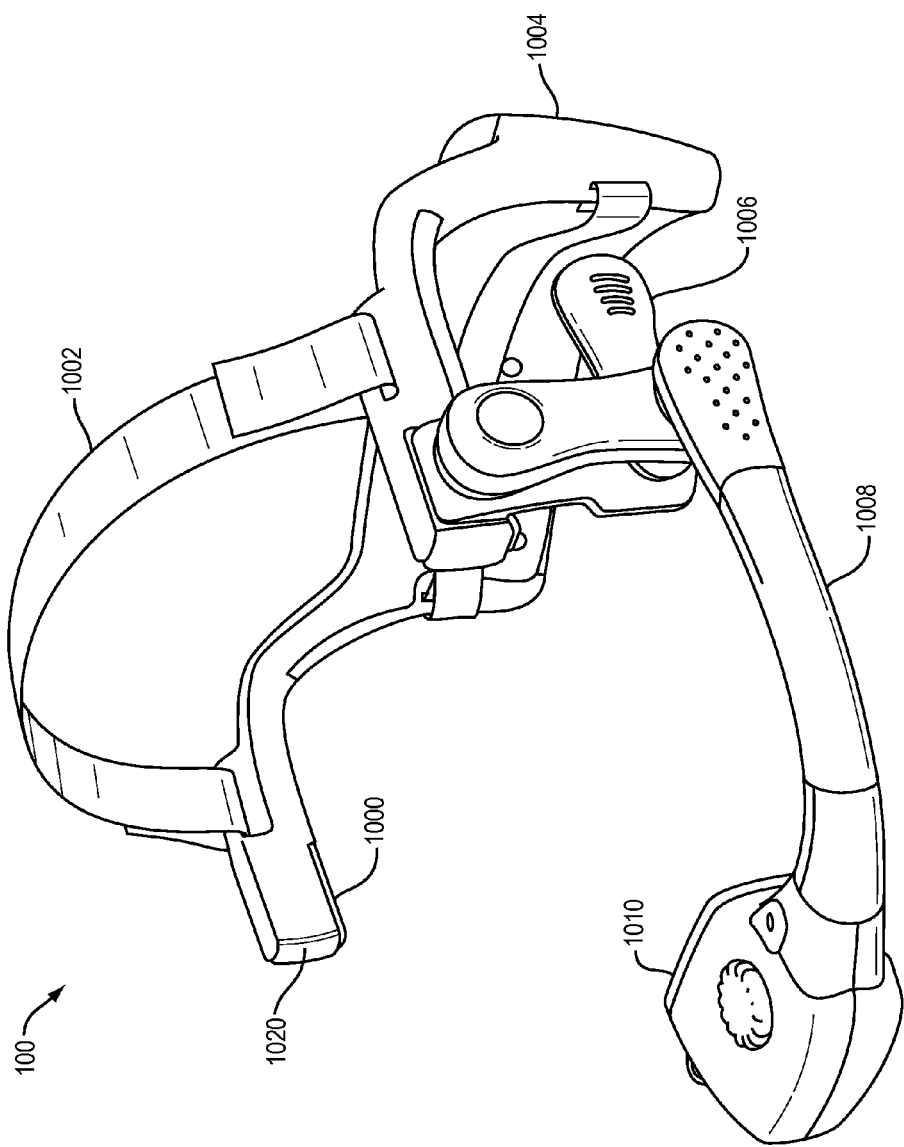

FIGS. 1A and 1B show an example embodiment of a wireless computing headset device 100 (also referred to herein as a headset computer (HSC) or head mounted display (HMD)) that incorporates a high-resolution (VGA or better) microdisplay element 1010, and other features described below.

HSC 100 can include audio input and/or output devices, including one or more microphones, input and output speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports 1020 (FIG. 1B).

Typically located within the housing of headset computing device 100 are various electronic circuits including, a microcomputer (single or multicore processors), one or more wired and/or wireless communications interfaces, memory or storage devices, various sensors and a peripheral mount or mount, such as a "hot shoe."

Example embodiments of the HSC 100 can receive user input through sensing voice commands, head movements, 110, 111, 112 and hand gestures 113, or any combination thereof. A microphone (or microphones) operatively coupled to or integrated into the HSC 100 can be used to capture speech commands, which are then digitized and processed using automatic speech recognition techniques. Gyroscopes, accelerometers, and other micro-electromechanical system sensors can be integrated into the HSC 100 and used to track the user's head movements 110, 111, 112 to provide user input commands. Cameras or motion tracking sensors can be used to monitor a user's hand gestures 113 for user input commands. Such a user interface may overcome the disadvantages of hands-dependent formats inherent in other mobile devices.

The HSC 100 can be used in various ways. It can be used as a peripheral display for displaying video signals received and processed by a remote host computing device 200 (shown in FIG. 1A). The host 200 may be, for example, a notebook PC, smart phone, tablet device, or other computing device having less or greater computational complexity than the wireless computing headset device 100, such as cloud-based network resources. The headset computing device 100 and host 200 can wirelessly communicate via one or more wireless protocols, such as Bluetooth®, Wi-Fi, WiMAX, 4G LTE or other wireless radio link 150. (Bluetooth is a registered trademark of Bluetooth Sig, Inc. of 5209 Lake Washington Boulevard, Kirkland, Wash. 98033).

In an example embodiment, the host 200 may be further connected to other networks, such as through a wireless connection to the Internet or other cloud-based network resources, so that the host 200 can act as a wireless relay between the HSC 100 and the network 210. Alternatively, some embodiments of the HSC 100 can establish a wireless connection to the Internet (or other cloud-based network resources) directly, without the use of a host wireless relay. In such embodiments, components of the HSC 100 and the host 200 may be combined into a single device.

FIG. 1B is a perspective view showing some details of an example embodiment of a headset computer 100. The example embodiment HSC 100 generally includes, a frame 1000, strap 1002, rear housing 1004, speaker 1006, cantilever, or alternatively referred to as an arm or boom 1008 with a built in microphone, and a micro-display subassembly 1010.

A head worn frame 1000 and strap 1002 are generally configured so that a user can wear the headset computer device 100 on the user's head. A housing 1004 is generally a low profile unit which houses the electronics, such as the microprocessor, memory or other storage device, along with other associated circuitry. Speakers 1006 provide audio output to the user so that the user can hear information. Micro-display subassembly 1010 is used to render visual information to the user. It is coupled to the arm 1008. The arm 1008 generally provides physical support such that the micro-display subassembly is able to be positioned within the user's field of view 300 (FIG. 1A), preferably in front of the eye of the user or within its peripheral vision preferably slightly below or above the eye. Arm 1008 also provides the electrical or optical connections between the micro-display subassembly 1010 and the control circuitry housed within housing unit 1004.

According to aspects that will be explained in more detail below, the HSC display device 100 allows a user to select a field of view 300 within a much larger area defined by a virtual display 400. The user can typically control the position, extent (e.g., X-Y or 3D range), and/or magnification of the field of view 300.

While what is shown in FIGS. 1A and 1B is a monocular micro-display presenting a single fixed display element supported on the face of the user with a cantilevered boom, it should be understood that other mechanical configurations for the remote control display device 100 are possible, such as a binocular display with two separate micro-displays (e.g., one for each eye) or a single micro-display arranged to be viewable by both eyes.

FIG. 2 is a block diagram showing more detail of an embodiment of the HSC or HMD device 100, host 200 and the data that travels between them. The HSC or HMD device 100 receives vocal input from the user via the microphone, hand movements or body gestures via positional and orientation sensors, the camera or optical sensor(s), and head movement inputs via the head tracking circuitry such as 3 axis to 9 axis degrees of freedom orientational sensing. These are translated by software (processors) in the HSC or HMD device 100 into keyboard and/or mouse commands that are then sent over the Bluetooth or other wireless interface 150 to the host 200. The host 200 then interprets these translated commands in accordance with its own operating system/application software to perform various functions. Among the commands is one to select a field of view 300 within the virtual display 400 and return that selected screen data to the HSC or HMD device 100. Thus, it should be understood that a very large format virtual display area might be associated with application software or an operating system running on the host 200. However, only a portion of that large virtual display area 400 within the field of view 300 is returned to and actually displayed by the micro display 1010 of HSC or HMD device 100.

In one embodiment, the HSC 100 may take the form of the device described in a co-pending US Patent Publication Number 2011/0187640, which is hereby incorporated by reference in its entirety.

In another embodiment, the invention relates to the concept of using a Head Mounted Display (HMD) 1010 in conjunction with an external 'smart' device 200 (such as a smartphone or tablet) to provide information and control to the user hands-free. The invention requires transmission of small amounts of data, providing a more reliable data transfer method running in real-time.

In this sense therefore, the amount of data to be transmitted over the connection 150 is small-simply instructions on how to lay out a screen, which text to display, and other stylistic information such as drawing arrows, or the background colors, images to include, etc.

Additional data could be streamed over the same 150 or another connection and displayed on screen 1010, such as a video stream if required by the host 200.

Figure 3:
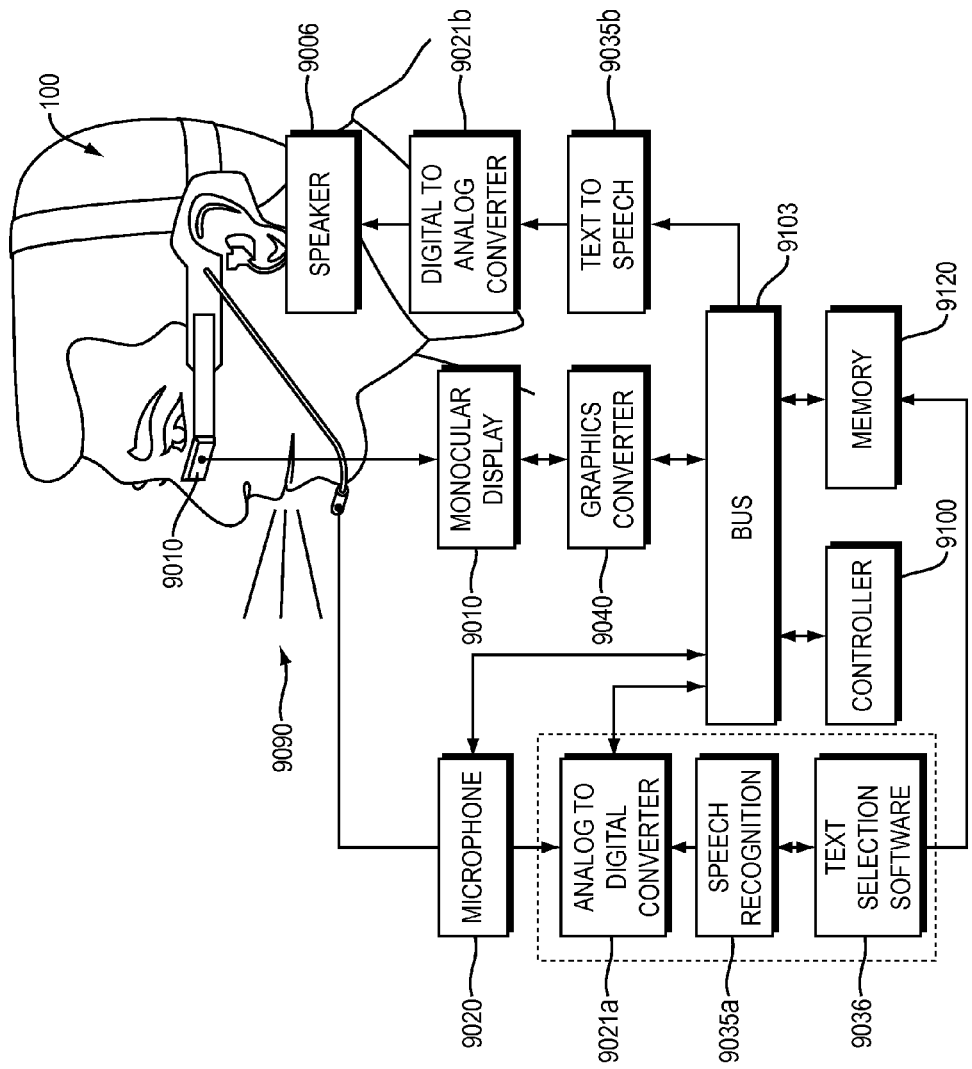
FIG. 3 is a block diagram of an embodiment of the present invention.

FIG. 3 shows an example embodiment of a wireless hands-free video computing headset 100 under voice command, according to one embodiment of the present invention. The user may be presented with an image on the micro-display 9010, for example, as output by host computer 200 application mentioned above. A user of the HMD 100 can employ joint head-tracking and voice command text selection software module 9036, either locally or from a remote host 200, in which the user is presented with a sequence of screen views implementing hands free text selection on the micro-display 9010 and the audio of the same through the speaker 9006 of the headset computer 100. Because the headset computer 100 is also equipped with a microphone 9020, the user can utter voice commands (e.g., to make command selections) as illustrated next with respect to embodiments of the present invention.

The described embodiments may be employed by a user who is viewing a field of text on a micro-display. This could be in any of several environments, such as a webpage browser, an email viewing tool or a document editor. The screen 1010 may allow head-tracker panning of the environment. The head-tracker may be controlled by an accelerometer or other such device within the HSC 100 mentioned above.

Figure 4:
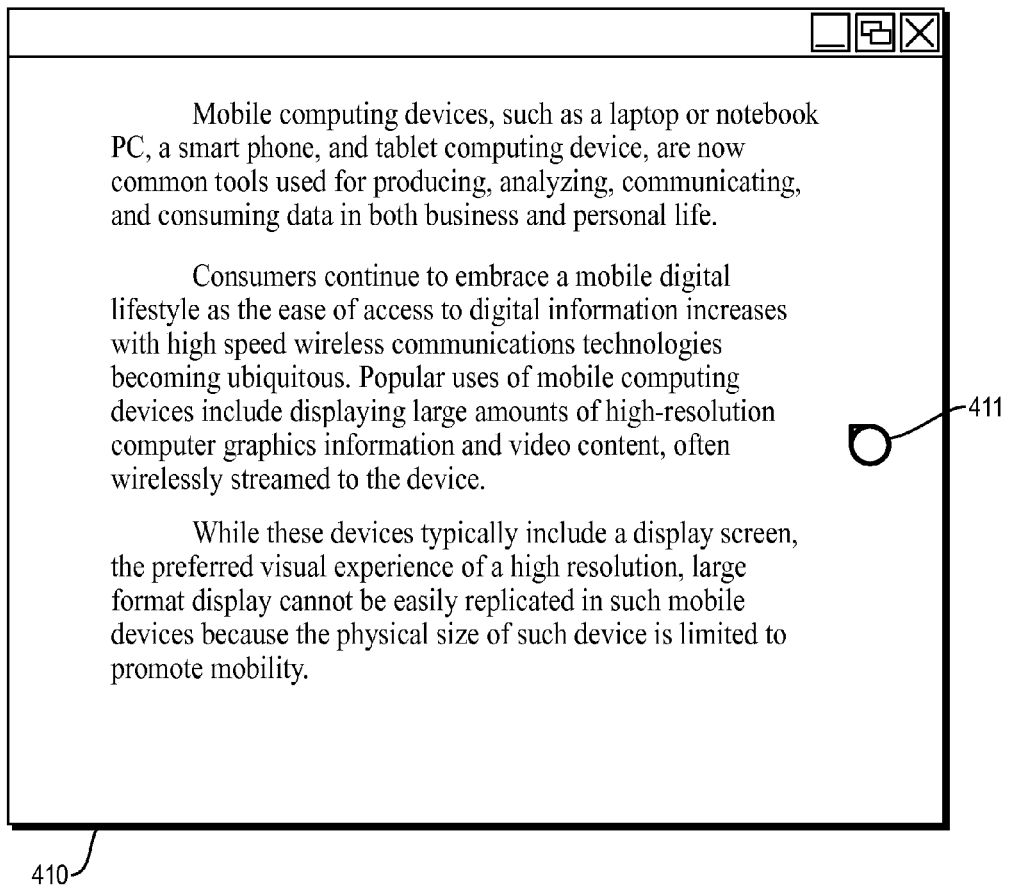
FIGS. 4-7 are schematic views illustrating joint head tracker and voice command text selection in a graphical user interface of embodiments.

In practice, when a user desires to select a portion of text being viewed, the user may issue a voice command, for example "Text Selection." In response, text selection module 9036 may cause the head-tracker panning capability to stop or pause, and to display a Pointer 411 in the screen view 410 that the user sees on the display 1010 (refer, for example, to FIG. 4). The user may move this Pointer 411 in relation to the last head-tracking position by changing the orientation of his head. Sensors associated with the HSC 100 detect the change in the user's head orientation and move the Pointer 411 corresponding to the altered orientation.

For example, in FIG. 4, the Pointer 411 is shown slightly to the right of the screen view 410 center. The user tilting his head upwards causes text selection software module 9036 to move the Pointer 411 upwards a predetermined amount, or until Pointer 411 meets the screen view 410 edges. Similarly text selection module 9036 moves Pointer 411 in other directions corresponding to the orientation of the user's head.

Based on user preference, there may some indicia or other symbol associated with the Pointer 411 (e.g., a circle around or adjacent to the pointer) that may delineate a region of the display and/or acts as a magnifier, to enable the user to clearly position the pointer 411 in relation to the text that he wishes to select. In the example embodiments, an opaque circle symbol is shown associated with Pointer 411. In another example, the symbol may be a large, magnifying circle with crosshairs that are used to specify points of interest.

The user moves the Pointer 411, using the changes to head orientation or voice commands described herein, to either the start or end character of the portion or passages of text (text selection) that he wishes to make subject to the current operation. If the user needs the screen view 410 page to pan in any direction, the system 100 may accept voice commands to pan the main page in lieu of the head-tracking panning being available, such as "Pan Left", "Pan Right" etc. The HSC 100 pans the page on these voice commands by a limited amount with each command issued (utterance).

Figure 5:
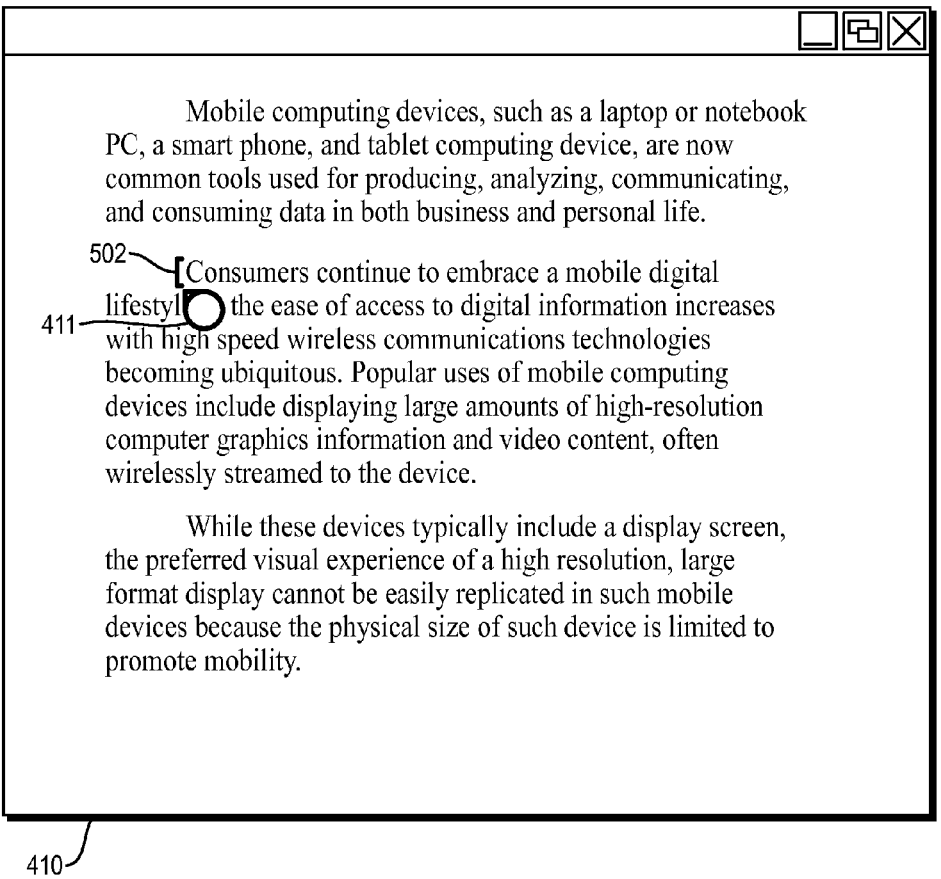

Once the user has properly positioned the Pointer 411, he issues a voice command, for example "Place Point One," which causes the text selection module 9036/HSC 100 to display the first Point 502 (P1) on screen (see FIG. 5), shown in this example as a bracket symbol. In order to make it clear to the user that the first Point has been so placed (i.e., established on the screen), in addition to the Point P1 502 being positioned, the Pointer 411 may disappear for a brief period (e.g., one second, although other periods may be used), so the user can clearly see the position of the Point P1 502 placed. The Pointer 411 subsequently reappears in its former position, and is able to be moved by the user using the head-tracker and/or voice commands (as described herein). Other visual indications (i.e., other than disappearing/reappearing as described above), for example highlighting, may be used to indicate to the user the position of the P1 502 placement.

Figure 6:
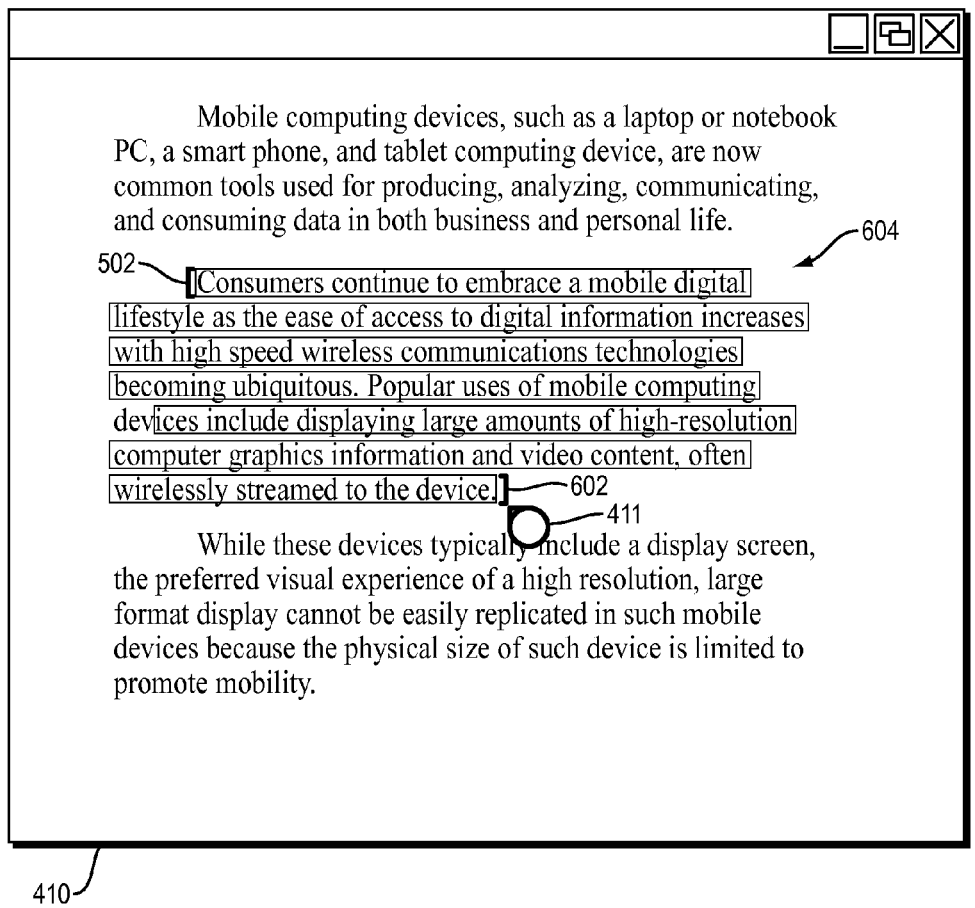

The user next moves the Pointer 411, using head motion and/or voice commands as described herein, to the corresponding counterpart or pairing position to the first Point P1 502 placed (either at the start or end of the desired text selection as appropriate). The user issues a pertinent voice command (for example "Place Point Two"). In response, HSC 100/module 9036 places the second Point 602 (P2), and highlights 604 the displayed text between the two points P1 502 and P2 602, to give a similar experience to using a mouse to highlight text as shown in the example depicted in FIG. 6.

Figure 7:
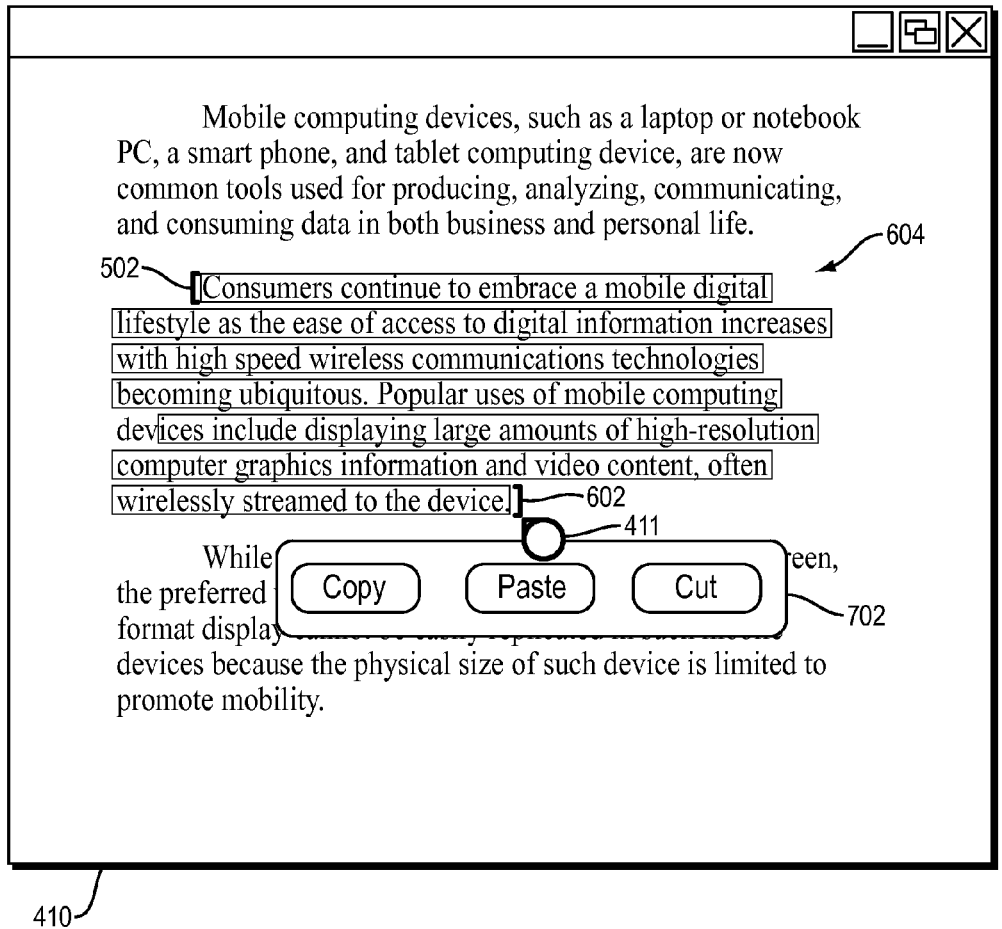

The system 100 may then present options 450 to carry out functions on the text selection, on a per-application basis. The options may be selectable, for example, using voice commands. In a Word Processing application, the user might be able to delete the selected text (subject text selection) for example. In other contexts, the user may be able to copy the contents of the text selection, or email a copy of the text selection as non-limiting examples. FIG. 7 shows some example pop-up option window 702 available in one graphical user interface. Other configurations such as drop down menus and the like are suitable for use in the described embodiments.

FIG. 3 shows a schematic diagram illustrating the modules of the headset computer 100. FIG. 3 includes a schematic diagram of the operative modules of the headset computer 100.

For the case of hands free text selection in the present invention, controller 9100 may access text selection module 9036, which can be positioned locally to each HMD 100, or remotely at a host 200 (FIGS. 1A-1B).

Text selection software module 9036 may contain instructions to facilitate a display of a sequence of screen views 410 to a user, responsive to user head tracking and voice commands (as described above in association with example FIGS. 4-7). The graphics converter module 9040 may convert instructions received from the text selection module 9036, via bus 9103, and convert the instructions into graphics to be displayed in screen views 410 on the monocular display 9010.

The text-to-speech module 9035b may, contemporaneous with the graphics display described above, convert the instructions from text selection software module 9036 into digital sound representations corresponding to the contents of the screen views 410 to be displayed. The text-to-speech module 9035b feeds the digital sound representations to the digital-to-analog converter 9021b, which in turn feeds speaker 9006 to present the audio output to the user.

Instead of (or in addition to) the head tracking information, the user may submit spoken commands. The user may speak/utter an item from the command selection presented in the screen view 410. The user's speech 9090 is received at microphone 9020. The received speech may be converted to a digital speech signal by the analog to digital converter 9021a. The speech recognition module 9035a may then process the digital speech signal into recognized speech. The speech recognition module 9035a may further compare the recognized speech against known speech information and produce or otherwise output operating parameter values, pertinent instructions and the like to the text selection module 9036. In response, text selection module 9036 may carry out user voice commands jointly with head tracking operations for hands-free user text selection as detailed above in example FIG. 4-7.

Figure 8:
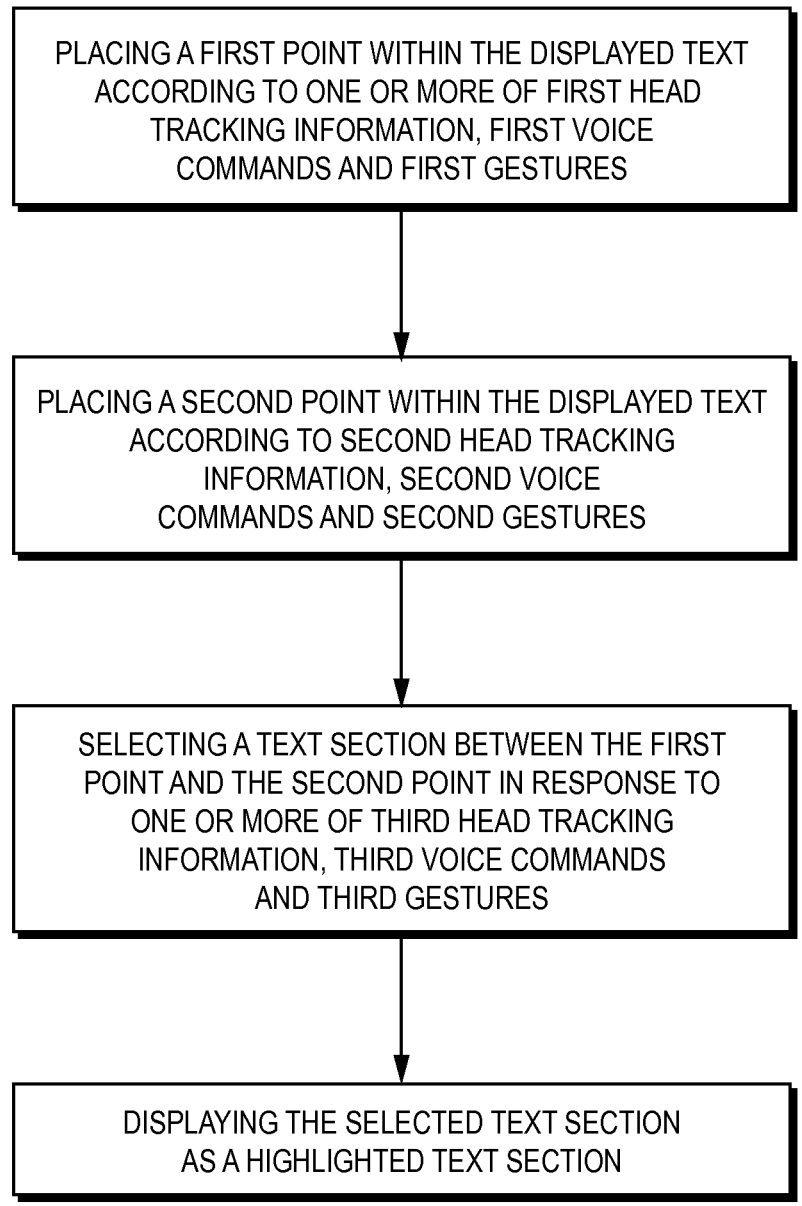
FIG. 8 is a flow diagram according to one embodiment of the invention.

FIG. 8 is a flow diagram according to one of the described embodiments.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-based method of selecting text, comprising:
  with a headset computer, including a processor, the headset computer displaying text in a screen view:
  placing a first point, characterized by a first symbol, within the displayed text according to one or more of first head tracking information, first voice commands and first gestures, the first symbol periodically appearing and disappearing for a predetermined duration after being placed;
  placing a second point, characterized by a second symbol, within the displayed text according to second head tracking information, second voice commands and second gestures, the second symbol periodically appearing and disappearing for a predetermined duration after being placed;
  selecting a text section between the first point and the second point in response to one or more of third head tracking information, third voice commands and third gestures; and
  displaying the selected text section as a highlighted text section.

2. The method of claim 1, further including making the highlighted text section available for a common operation.

3. The method of claim 2, wherein the common operation includes one or more of copy, paste, cut, move, email and forward.

4. The method of claim 2, wherein the common operation is selectable by one or more of (i) a pop-up option window and (ii) a drop down menu.

5. The method of claim 1, wherein placing the first point or placing the second point further includes manipulating a pointer within the screen view until the pointer reaches a desired location, and using one or more of a particular voice command or a particular gesture to instantiate the first point or second point.

6. The method of claim 5, wherein the pointer includes an associated symbol that provides one or more of (i) a text magnifier and (ii) a text delineator.

7. The method of claim 1, wherein the first symbol is a bracket and the second symbol is a bracket.

8. The method of claim 1, wherein the highlighted text section is characterized by a colored background.

9. A system for facilitating hands-free text selection, comprising:
   a headset computer, including a processor, configured to:
      display text in a screen view;
      place a first point, characterized by a first symbol, within the displayed text according to one or more of first head tracking information, first voice commands and first gestures, the first symbol periodically appearing and disappearing for a predetermined duration after being placed;
      place a second point, characterized by a second symbol, within the displayed text according to second head tracking information, second voice commands and second gestures, the second symbol periodically appearing and disappearing for a predetermined duration after being placed;
      select a text section between the first point and the second point in response to one or more of third head tracking information, third voice commands and third gestures; and
      display the selected text section as a highlighted text section.

10. The system of claim 9, wherein the headset computer is further configured to make the highlighted text section available for a common operation.

11. The system of claim 10, wherein the common operation includes one or more of copy, paste, cut, move, email and forward.

12. The system of claim 10, wherein the common operation is selectable by one or more of (i) a pop-up option window and (ii) a drop down menu.

13. The system of claim 9, wherein placing the first point or placing the second point further includes manipulating a pointer within the screen view until the pointer reaches a desired location, and using one or more of a particular voice command or a particular gesture to instantiate the first point or second point.

14. The system of claim 13, wherein the pointer includes an associated symbol that provides one or more of (i) a text magnifier and (ii) a text delineator.

15. The system of claim 9, wherein the first symbol is a bracket and the second symbol is a bracket.

16. The system of claim 9, wherein the highlighted text section is characterized by a colored background.

\* \* \* \* \*